(12) United States Patent
Yan et al.

(10) Patent No.: US 10,309,384 B2
(45) Date of Patent: Jun. 4, 2019

(54) PISTON COMPRESSOR AND REFRIGERATION SYSTEM HAVING THE SAME

(71) Applicants: ANHUI MEIZHI COMPRESSOR CO., LTD., Hefei (CN); MIDEA GROUP CO., LTD., Foshan (CN)

(72) Inventors: Zhiqi Yan, Hefei (CN); Gang Huang, Hefei (CN)

(73) Assignees: ANHUI MEIZHI COMPRESSOR CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 95 days.

(21) Appl. No.: 15/503,538

(22) PCT Filed: Jul. 22, 2015

(86) PCT No.: PCT/CN2015/084825
§ 371 (c)(1),
(2) Date: Feb. 13, 2017

(87) PCT Pub. No.: WO2017/012098
PCT Pub. Date: Jan. 26, 2017

(65) Prior Publication Data
US 2017/0241412 A1   Aug. 24, 2017

(30) Foreign Application Priority Data

Jul. 17, 2015  (CN) .......................... 2015 1 0427823
Jul. 17, 2015  (CN) ..................... 2015 2 0527820 U

(51) Int. Cl.
*F25B 1/02* (2006.01)
*F04B 39/00* (2006.01)
(Continued)

(52) U.S. Cl.
CPC ...... *F04B 39/0276* (2013.01); *F04B 39/0094* (2013.01); *F04B 39/02* (2013.01);
(Continued)

(58) Field of Classification Search
CPC .............. F04B 39/0276; F04B 39/0094; F04B 39/0284; F04B 39/0207; F04B 53/02;
(Continued)

(56) References Cited

FOREIGN PATENT DOCUMENTS

| CN | 103443457 A | 12/2013 |
|---|---|---|
| CN | 104632580 A | 5/2015 |
| CN | 204783552 U | 11/2015 |

OTHER PUBLICATIONS

Chinese Patent Application No. 201510427823.7 first Office Action dated Sep. 27, 2016, 7 pages.
(Continued)

*Primary Examiner* — Cassey D Bauer
(74) *Attorney, Agent, or Firm* — Lathrop Gage LLP

(57) ABSTRACT

A compressor and a refrigeration system having the same are provided. The compressor includes a crankcase, a thrust bearing and a crankshaft. The crankcase is formed with a crankshaft hole therein and provided with a mounting protrusion at an upper end thereof. The crankshaft hole runs upward through the mounting protrusion. The thrust bearing is fitted over the mounting protrusion. The crankshaft is rotatably disposed within the crankshaft hole, has a thrust part, and is formed with an oil supply passage therein. A lower end face of the thrust part is abutted against an upper end face of the thrust bearing. A cavity is defined by the mounting protrusion, the thrust bearing and the thrust part. A through hole is formed in a peripheral wall of the crankshaft for communicating the oil supply passage with the cavity.

20 Claims, 3 Drawing Sheets

(51) Int. Cl.
  *F04B 39/02* (2006.01)
  *F04B 39/12* (2006.01)
  *F16C 3/14* (2006.01)
  *F16C 3/08* (2006.01)
  *F16C 9/02* (2006.01)
  *F16C 19/12* (2006.01)

(52) U.S. Cl.
  CPC ...... *F04B 39/0246* (2013.01); *F04B 39/0284* (2013.01); *F04B 39/128* (2013.01); *F16C 3/08* (2013.01); *F16C 3/14* (2013.01); *F16C 9/02* (2013.01); *F16C 19/12* (2013.01); *F25B 1/02* (2013.01); *F16C 2360/42* (2013.01)

(58) Field of Classification Search
  CPC ........ F04B 53/04; F04B 53/06; F04B 39/041; F04B 27/10; F04B 39/04; F04B 39/02; F04B 35/04; F25B 1/02
  See application file for complete search history.

(56) References Cited

OTHER PUBLICATIONS

Chinese Patent Application No. 201510427823.7 English translation of first Office Action dated Sep. 27, 2016, 7 pages.
PCT/CN2015/084825 International Search Report and Written Opinion dated Apr. 6, 2016, 13 pages.
PCT/CN2015/084825 English translation of International Search Report dated Apr. 6, 2016, 2 pages.

PISTON COMPRESSOR AND REFRIGERATION SYSTEM HAVING THE SAME

CROSS-REFERENCE TO RELATED APPLICATION

The present application is a national phase entry under 35 USC § 371 of International Application PCT/CN2015/084825, filed Jul. 22, 2015, which claims the benefits of and priority to Chinese Patent Application Nos. 201510427823.7 and 201520527820.6, both filed Jul. 17, 2015, the entire disclosures of which are incorporated herein by reference.

FIELD

The present disclosure relates to a compressor field, and more particularly to a piston compressor and a refrigeration system having the same.

BACKGROUND

In the related art, a high efficiency compressor commonly includes a rolling thrust bearing, whose balls are discontinuously lubricated mainly by splash, which cannot adequately lubricate the balls, and the heat resulting from the friction between the balls and the upper and lower supporting plates cannot be completely taken away, thus resulting in an increased friction coefficient between the balls and the upper and lower supporting plates and a larger power consumption of the compressor.

SUMMARY

Embodiments of the present disclosure seek to solve at least one of the problems existing in the related art to at least some extent. For this, the present disclosure provides a piston compressor, in which the lubricating oil may continuously lubricate a thrust bearing, thus making the piston compressor have a good performance.

The present disclosure further provides a refrigeration system.

The piston compressor according to the present disclosure includes: a crankcase, a thrust bearing, and a crankshaft. The crankcase is formed with a crankshaft hole therein and provided with a mounting protrusion at an upper end thereof. The crankshaft hole runs upward through the mounting protrusion. The thrust bearing is fitted over the mounting protrusion. The crankshaft is rotatably disposed within the crankshaft hole, has a thrust part, and is formed with an oil supply passage therein. A lower end face of the thrust part is abutted against an upper end face of the thrust bearing. A cavity is defined by the mounting protrusion, the thrust bearing, and the thrust part. A through hole is formed in a peripheral wall of the crankshaft for communicating the oil supply passage with the cavity.

With the piston compressor according to embodiments of the present disclosure, the oil supply passage within the crankshaft may continuously supply the lubricating oil to the thrust bearing, the lubricating oil thereby may continuously lubricate balls, thus lowering the friction work between the balls and an upper supporting plate and between the balls and a lower supporting plate and improving the performance of the piston compressor. In addition, the lubricating oil may continuously take away the heat of the balls, thus further lowering the heat transmitted from the balls to a cage, and increasing a service life of the thrust bearing and thereby a service life of the piston compressor.

Further, the piston compressor according to the present disclosure also has the following additional technical features:

In some embodiments of the present disclosure, an upper end face of the mounting protrusion is higher than the upper end face of the thrust bearing in an axial direction of the crankshaft.

In some embodiments of the present disclosure, the thrust part is formed with a groove in a lower surface thereof, and the groove is concaved upward and configured to overlie the mounting protrusion to form at least a part of the cavity.

In some embodiments of the present disclosure, a top wall of the groove is higher than the upper end face of the mounting protrusion in the axial direction of the crankshaft.

In some embodiments of the present disclosure, a horizontal projection of the groove has a shape of an annulus, in which a center of the annulus coincides with an axis of the crankshaft hole.

In some embodiments of the present disclosure, a longitudinal projection of the groove has a shape of a taper, in which an opening of the taper faces toward the thrust bearing.

In some embodiments of the present disclosure, the mounting protrusion is in clearance fit with the thrust bearing.

In some embodiments of the present disclosure, the oil supply passage comprises an inclined segment, the inclined segment is formed within the crankshaft and inclined from an axis of the crankshaft toward the peripheral wall of the crankshaft, and the through hole is communicated with the inclined segment.

In some embodiments of the present disclosure, the inclined segment is spirally inclined.

The refrigeration system according to the present disclosure includes the piston compressor described above. The piston compressor of the refrigeration system having the piston compressor described above has a good performance and a long service life.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These described above and other aspects and advantages of embodiments of the present disclosure will become apparent and more readily appreciated from the following descriptions made with reference to the drawings, in which.

Figure 1:
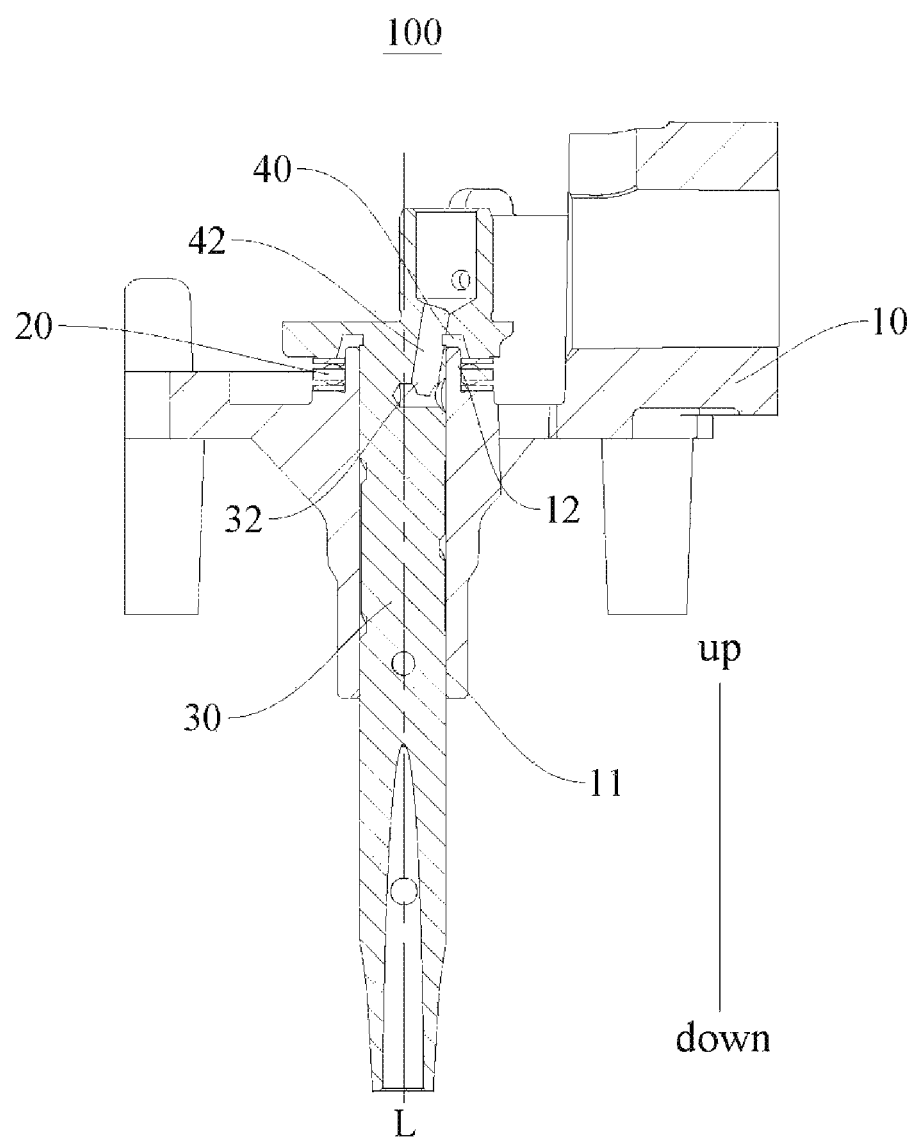
FIG. 1 is a sectional view of a piston compressor according to an embodiment of the present disclosure.

REFERENCE NUMERALS piston compressor 100; crankcase 10; crankshaft hole 11; mounting protrusion 12; thrust bearing 20; upper supporting plate 21; balls 22; lower supporting plate 23; cage 24;

crankshaft 30; thrust part 31; oil supply passage 32; groove 33; cavity 40; through hole 41; inclined segment 42.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, it is to be understood that unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the following, the piston compressor 100 according to embodiments of the present disclosure will be described in detail referring to FIG. 1 to FIG. 3.

As shown in FIG. 1, the piston compressor 100 according to embodiments of the present disclosure may include a crankcase 10, a thrust bearing 20, and a crankshaft 30. As shown in FIG. 1 and FIG. 2, the crankcase 10 is formed with a crankshaft hole 11 therein and provided with a mounting protrusion 12 at an upper end thereof, the crankshaft hole 11 runs upward through the mounting protrusion 12, and the crankshaft 30 is rotatably disposed within the crankshaft hole 11. The thrust bearing 20 is fitted over the mounting protrusion 12. Alternatively, the mounting protrusion 12 may be in clearance fit with the thrust bearing 20. However, the present disclosure is not limited thereto, the mounting protrusion 12 may be in transition fit with the thrust bearing 20.

Figure 2:
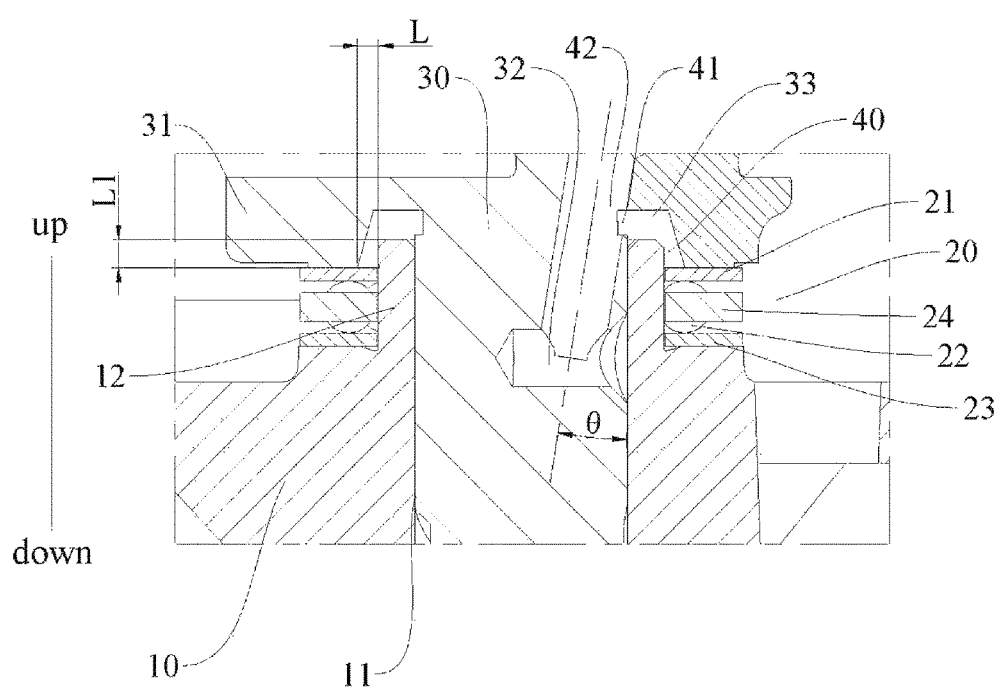
FIG. 2 is a partial sectional view of a piston compressor according to an embodiment of the present disclosure.

As shown in FIG. 2, the crankshaft 30 has a thrust part 31, a lower end face of the thrust part 31 is abutted against an upper end face of the thrust bearing 20, and the crankshaft 30 is formed with an oil supply passage therein. Specifically, as shown in FIG. 3, the oil supply passage 32 in the crankshaft 30 may suck lubricating oil from bottom to top, the lubricating oil may be thrown away from an upper end of the crankshaft 30 to lubricate other components (such as a connecting rod, a piston and a cylinder wall) within the piston compressor 100. A cavity 40 is defined by the mounting protrusion 12, the thrust bearing 20, and the thrust part 31, and a through hole 41 is formed in a peripheral wall of the crankshaft 30 for communicating the oil supply passage 32 with the cavity 40. It is to be understood that, the oil supply passage 32 in the crankshaft 30 may continuously suck lubricating oil from bottom to up, at the through hole 41, a part of the lubricating oil may continue to flow upward under the action of a centrifugal force, while another part of the lubricating oil may enter into the cavity 40 through the through hole 41, and thus at least a part of the lubricating oil may flow onto the thrust bearing 20, which can further flow into a gap between the mounting protrusion 12 and the thrust bearing 20.

Specifically, as shown in FIG. 2, the thrust bearing 20 includes: an upper supporting plate 21, balls 22, a lower supporting plate 23, and a cage 24. The balls 22 are disposed within the cage 24, the upper supporting plate 21 is placed above the cage 24 and the balls 22, while the lower supporting plate 23 is placed below the cage 24 and the balls 22. The lubricating oil flowing into the cavity 40 may flow onto the upper supporting plate 21 of the thrust bearing 20, the lubricating oil on the upper supporting plate 21 may flow downward into the balls 22 and the cage 24 through the gap between the mounting protrusion 12 and the thrust bearing 20, and thereby the lubricating oil may continuously lubricate the balls 22, thus lowering the friction work between the balls 22 and the upper supporting plate 21 and between the balls 22 and the lower supporting plate 23 and improving the performance of the piston compressor 100. In addition, the lubricating oil may continuously take away the heat of the balls 22, thus further lowering the heat transmitted from the balls 22 to the cage 24, and increasing a service life of the thrust bearing 20 and thereby a service life of the piston compressor 100.

It is to be understood that, when the piston compressor 100 works, the lubricating oil may be thrown to different positions of the cavity 40 through the through hole 41 by the continuously rotated crankshaft 30, and thus may be quickly distributed on the entire upper supporting plate 21 of the thrust bearing 20, and thereby the lubricating oil on the upper supporting plate 21 may continuously flow downward onto the balls 22. Thus, with the piston compressor 100 according to embodiments of the present disclosure, the oil supply passage 32 within the crankshaft 30 may continuously supply the lubricating oil to the thrust bearing 20, the lubricating oil thereby may continuously lubricate the balls 22, thus lowering the friction work between the balls 22 and the upper supporting plate 21 and between the balls 22 and the lower supporting plate 23 and improving the performance of the piston compressor 100. In addition, the lubricating oil may continuously take away the heat of the balls 22, thus further lowering the heat transmitted from the balls 22 to the cage 24, and increasing a service life of the thrust bearing 20 and thereby a service life of the piston compressor 100.

In some embodiments of the present disclosure, as shown in FIG. 2, an upper end face of the mounting protrusion 12 may be higher than the upper end face of the thrust bearing 20 in an axial direction of the crankshaft 30 (i.e. an up-down direction shown in FIG. 2). It is to be understood that, when the upper end face of the mounting protrusion 12 is higher than the upper end face of the thrust bearing 20 in the up-down direction, the lubricating oil flowing into the cavity 40 may be at least partially stored on an upper surface of the upper supporting plate 21 of the thrust bearing 20, and thus the lubricating oil may continuously lubricate the balls 22 more easily.

Figure 3:
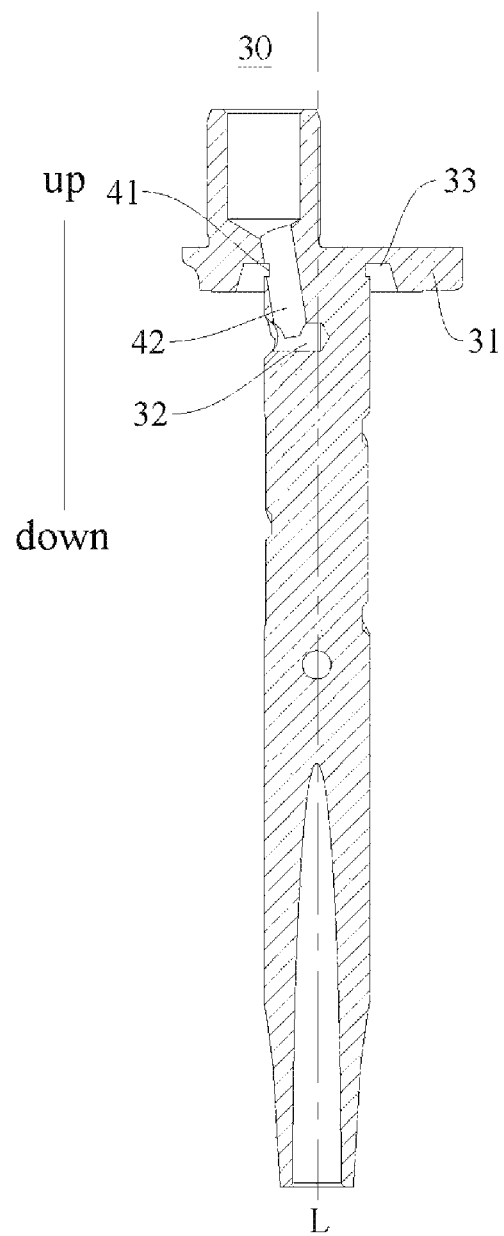
FIG. 3 is a sectional view of a crankshaft of a piston compressor according to an embodiment of the present disclosure.

Alternatively, as shown in FIG. 2 and FIG. 3, the thrust part 31 may be formed with a groove 33 in a lower surface thereof, and the groove 33 is concaved upward and configured to overlie the mounting protrusion 12 to form at least a part of the cavity 40. As shown in FIG. 2, the through hole 41 in the oil supply passage 32 may be opposite to the groove 33, the lubricating oil flowing out from the through hole 41 may flow into the cavity 40. By forming the through hole 41, the volume of the cavity 40 may be increased, it is easy to form the through hole 41, and the lubricating oil may flow into the cavity 40 more easily. Alternatively, a top wall of the groove 30 may be higher than the upper end face of the mounting protrusion 12 in the axial direction of the crankshaft 30, and thus the lubricating oil flowing out from the through hole 41 may flow into the cavity 40 easily.

Alternatively, a horizontal projection of the groove 33 may have a shape of an annulus, in which a center of the annulus coincides with an axis of the crankshaft hole 11. That is, the groove 33 forms an annular structure around the crankshaft hole 11. With the groove 33 with the annular structure, the lubricating oil flowing out from the through hole 41 may flow onto different positions of the upper supporting plate 21 of the thrust bearing 20 within the cavity 40 easily.

Alternatively, as shown in FIG. 2, a longitudinal projection of the groove 30 may have a shape of a taper, in which an opening of the taper faces toward the thrust bearing 20. It is to be understood that, when the lubricating oil flowing out from the through hole 41 is splashed to the peripheral wall of the groove 33, the lubricating oil flows from the peripheral wall of the groove 33 to the upper supporting plate 21 of the thrust bearing 20 positioned below the peripheral wall of the groove 33, and thus the lubricating oil may be easily distributed on the entire upper surface of the upper supporting plate 21 so as to enable the lubricating oil to continuously lubricate the balls 22.

In some specific embodiments of the present disclosure, the oil supply passage 32 may include an inclined segment 42, the inclined segment 42 is formed within the crankshaft 30 and is inclined from an axis L of the crankshaft 30 toward the peripheral wall of the crankshaft 30, and the through hole 41 is communicated with the inclined segment 42. Specifically, the inclined segment 42 may be spirally inclined. It is to be understood that, the inclined segment 42 may increase the lift force of the lubricating oil, and the spirally inclined segment 42 may further increase the lift force of the lubricating oil, so that the lubricating oil may flow from bottom to top under the action of a centrifugal force.

It should be noted that, a distribution of the lubricating oil of the piston compressor 100 may be adjusted by regulating the position of the through hole 41 and a parameter L. As shown in FIG. 2, the position of the through hole 41 may be adjusted by regulating an inclination angle θ of the inclined segment 42 relative to the crankshaft hole 11 and a distance L1 from an end face of the mounting protrusion 12 and an end face of the thrust bearing 20, a cross section of the through hole 41 and thus the oil output from the through hole 41 may be adjusted by regulating the inclination angle θ and the distance L1. The parameter L is a distance from a part of the groove 33 near a peripheral wall of the thrust bearing 20 to an outer end face of the mounting protrusion 12, a lubrication speed of the lubricating oil for lubricating the balls 22 of the thrust bearing 20 may be adjusted by regulating the parameter L. By reasonably adjusting the parameter L, the inclination angle θ, and the distance L1, the balls 22 may be fully lubricated, while other movement friction pairs of the piston compressor 100 may be ensured to be fully lubricated by the oil supply passage 32.

A refrigeration system according to an embodiment of the present disclosure includes the piston compressor 100 described in above embodiments. The piston compressor 100 of the refrigeration system including the piston compressor 100 described in above embodiments has a good performance and a long service life.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, changes, alternatives, and modifications can be made in the embodiments without departing from spirit, principles and scope of the present disclosure, and the scope of the present disclosure is defined by the claims and their equivalents.

What is claimed is:

1. A piston compressor, comprising:
    a crankcase formed with a crankshaft hole therein and provided with a mounting protrusion at an upper end thereof, wherein the crankshaft hole runs upward through the mounting protrusion;
    a thrust bearing fitted over the mounting protrusion;
    a crankshaft rotatably disposed within the crankshaft hole, having a thrust part, and formed with an oil supply passage therein, wherein a lower end face of the thrust part is abutted against an upper end face of the thrust bearing,
    wherein a cavity is defined by the mounting protrusion, the thrust bearing, and the thrust part, and a through hole is formed in a peripheral wall of the crankshaft for communicating the oil supply passage with the cavity.

2. The piston compressor according to claim 1, wherein an upper end face of the mounting protrusion is higher than the upper end face of the thrust bearing in an axial direction of the crankshaft.

3. The piston compressor according to claim 2, wherein the thrust part is formed with a groove in a lower surface thereof, and the groove is concaved upward and configured to overlie the mounting protrusion to form at least a part of the cavity.

4. The piston compressor according to claim 3, wherein a top wall of the groove is higher than the upper end face of the mounting protrusion in the axial direction of the crankshaft.

5. The piston compressor according to claim 3, wherein a horizontal projection of the groove has a shape of an annulus, in which a center of the annulus coincides with an axis of the crankshaft hole.

6. The piston compressor according to claim 3, wherein a longitudinal projection of the groove has a shape of a taper, in which an opening of the taper faces toward the thrust bearing.

7. The piston compressor according to claim 1, wherein the mounting protrusion is in clearance fit with the thrust bearing.

8. The piston compressor according to claim 1, wherein the oil supply passage comprises an inclined segment, the inclined segment is formed within the crankshaft and inclined from an axis of the crankshaft toward the peripheral wall of the crankshaft, and the through hole is communicated with the inclined segment.

9. The piston compressor according to claim 8, wherein the inclined segment is spirally inclined.

10. A refrigeration system, comprising a piston compressor, the piston compressor comprising:
a crankcase formed with a crankshaft hole therein and provided with a mounting protrusion at an upper end thereof, wherein the crankshaft hole runs upward through the mounting protrusion;
a thrust bearing fitted over the mounting protrusion;
a crankshaft rotatably disposed within the crankshaft hole, having a thrust part, and formed with an oil supply passage therein, wherein a lower end face of the thrust part is abutted against an upper end face of the thrust bearing,
wherein a cavity is defined by the mounting protrusion, the thrust bearing, and the thrust part, and a through hole is formed in a peripheral wall of the crankshaft for communicating the oil supply passage with the cavity.

11. The refrigeration system according to claim 10, wherein an upper end face of the mounting protrusion is higher than the upper end face of the thrust bearing in an axial direction of the crankshaft.

12. The refrigeration system according to claim 11, wherein the thrust part is formed with a groove in a lower surface thereof, and the groove is concaved upward and configured to overlie the mounting protrusion to form at least a part of the cavity.

13. The refrigeration system according to claim 12, wherein a top wall of the groove is higher than the upper end face of the mounting protrusion in the axial direction of the crankshaft.

14. The refrigeration system according to claim 12, wherein a horizontal projection of the groove has a shape of an annulus, in which a center of the annulus coincides with an axis of the crankshaft hole.

15. The refrigeration system according to claim 12, wherein a longitudinal projection of the groove has a shape of a taper, in which an opening of the taper faces toward the thrust bearing.

16. The refrigeration system according to claim 10, wherein the mounting protrusion is in clearance fit with the thrust bearing.

17. The refrigeration system according to claim 10, wherein the oil supply passage comprises an inclined segment, the inclined segment is formed within the crankshaft and inclined from an axis of the crankshaft toward the peripheral wall of the crankshaft, and the through hole is communicated with the inclined segment.

18. The refrigeration system according to claim 17, wherein the inclined segment is spirally inclined.

19. A piston compressor, comprising:
a crankcase formed with a crankshaft hole therein and provided with a mounting protrusion at an upper end thereof, wherein the crankshaft hole runs upward through the mounting protrusion;
a thrust bearing fitted over the mounting protrusion;
a crankshaft rotatably disposed within the crankshaft hole, having a thrust part integrally formed with the crankshaft, and formed with an oil supply passage therein, wherein a lower end face of the thrust part is abutted against an upper end face of the thrust bearing,
wherein a cavity is defined by the mounting protrusion, the thrust bearing, and the thrust part, and a through hole is formed in a peripheral wall of the crankshaft for communicating the oil supply passage with the cavity.

20. The piston compressor according to claim 19, wherein the thrust part is formed with a groove in a lower surface thereof, and the groove is concaved upward and covers the mounting protrusion to form at least a part of the cavity.

* * * * *